US010936880B2

(12) United States Patent
Eronen et al.

(10) Patent No.: US 10,936,880 B2
(45) Date of Patent: Mar. 2, 2021

(54) SURVEILLANCE (71) Applicant: NOKIA TECHNOLOGIES OY, Espoo (FI)

(72) Inventors: Antti Eronen, Tampere (FI); Jussi Leppänen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/547,275

(22) PCT Filed: Jan. 20, 2016

(86) PCT No.: PCT/FI2016/050025
§ 371 (c)(1),
(2) Date: Jul. 28, 2017

(87) PCT Pub. No.: WO2016/120520
PCT Pub. Date: Aug. 4, 2016

(65) Prior Publication Data
US 2018/0025232 A1    Jan. 25, 2018

(30) Foreign Application Priority Data
Jan. 30, 2015  (EP) ..................... 15153375

(51) Int. Cl.
G06K 9/00    (2006.01)
H04N 7/18    (2006.01)
(Continued)

(52) U.S. Cl.
CPC .......... G06K 9/00771 (2013.01); G06F 3/14 (2013.01); G06K 9/00288 (2013.01);
(Continued)

(58) Field of Classification Search
CPC .......... G06K 9/00771; G06K 9/00288; G06K 9/00335; G06K 9/00369; G06K 9/78;
(Continued)

(56) References Cited

U.S. PATENT DOCUMENTS 6,243,104 B1 *  6/2001  Murray ................. G06F 40/174
                                                    345/629
8,725,567 B2 *  5/2014  Huang .................... G06Q 30/02
                                                    705/14.49
(Continued)

FOREIGN PATENT DOCUMENTS

CN    102196251 A    9/2011
CN    104065928 A    9/2014
(Continued)

OTHER PUBLICATIONS

International Search Report & Written Opinion dated Mar. 17, 2016 corresponding to International Patent Application No. PCT/FI2016/050025.
(Continued)

Primary Examiner — Amandeep Saini
(74) Attorney, Agent, or Firm — Squire Patton Boggs (US) LLP (57) ABSTRACT A method comprising: associating a message with one or more presentation criterion and a physical location in a scene; automatically processing recorded first sensor data from the scene to recognize automatically satisfaction of the one or more presentation criterion; and in response to recognition of satisfaction of the one or more presentation criterion entering a presentation state to enable: automatic presentation of the message into the scene at the physical location.

21 Claims, 2 Drawing Sheets (51) Int. Cl.
| | |
|---|---|
| *H04N 21/4223* | (2011.01) |
| *H04N 21/442* | (2011.01) |
| *G06F 3/14* | (2006.01) |
| *G08B 21/24* | (2006.01) |
| *G10L 15/22* | (2006.01) |
| *H04N 21/81* | (2011.01) |
| *H04N 21/431* | (2011.01) |
| *G10L 17/00* | (2013.01) |
| *G06T 7/50* | (2017.01) |
| *G06T 7/70* | (2017.01) |
| *G06K 9/78* | (2006.01) |
| *G06T 7/20* | (2017.01) |

(52) U.S. Cl.
CPC ..... *G06K 9/00335* (2013.01); *G06K 9/00369* (2013.01); *G08B 21/24* (2013.01); *G10L 15/22* (2013.01); *H04N 7/18* (2013.01); *H04N 21/4223* (2013.01); *H04N 21/44218* (2013.01); *G06K 9/78* (2013.01); *G06T 7/20* (2013.01); *G06T 7/50* (2017.01); *G06T 7/70* (2017.01); *G06T 2207/30196* (2013.01); *G06T 2207/30232* (2013.01); *G10L 17/00* (2013.01); *H04N 21/4316* (2013.01); *H04N 21/814* (2013.01)

(58) Field of Classification Search
CPC .......... G06F 3/14; G08B 21/24; G10L 15/22; G10L 17/005; G06T 7/50; G06T 7/20; G06T 2207/30196; G06T 2207/30232; G06T 7/70; H04N 21/4316; H04N 21/814; H04N 7/18; H04N 21/4223; H04N 21/44218
USPC ........................................................ 382/103
See application file for complete search history.

(56) References Cited

U.S. PATENT DOCUMENTS

| | | | | |
|---|---|---|---|---|
| 2010/0328419 | A1* | 12/2010 | Etter ...................... | H04N 5/607 348/14.08 |
| 2012/0095812 | A1* | 4/2012 | Stefik .................... | G06Q 10/00 705/13 |
| 2012/0249787 | A1* | 10/2012 | Allegra .................. | H04N 7/18 348/143 |
| 2014/0306799 | A1* | 10/2014 | Ricci ..................... | H04W 4/21 340/5.83 |
| 2015/0015718 | A1 | 1/2015 | Fujimatsu et al. | |

FOREIGN PATENT DOCUMENTS

| | | |
|---|---|---|
| EP | 3 051 810 A1 | 8/2016 |
| JP | 11-197116 A | 7/1999 |
| JP | 2005-056213 A | 3/2005 |
| JP | 2005-275842 A | 10/2005 |
| JP | 2005-303832 A | 10/2005 |
| JP | 2009-177554 A | 8/2009 |
| JP | 2011-253375 A | 12/2011 |
| JP | 2013-088906 A | 5/2013 |
| JP | 2014-089524 A | 5/2014 |
| JP | 6568224 B2 | 8/2019 |
| WO | 2008/138144 A1 | 11/2008 |
| WO | WO 2008/138144 A1 | 11/2008 |
| WO | 2014172322 A1 | 10/2014 |

OTHER PUBLICATIONS

Vietnamese Office Action Application No. 1-2017-03018 dated Oct. 5, 2017.
Japanese Office Action corresponding to Appln. No. 2017-540151, dated Nov. 6, 2018.
European Office Action corresponding to Application No. 15 153 375.9, dated Feb. 6, 2019.
Office Action dated Jul. 3, 2019 corresponding to Chinese Patent Application No. 201680007662.9.
Mexican Office Action corresponding to MX Appln. No. MX/a/2017/009797, dated Nov. 6, 2019.
Aug. 4, 2020 Office Action issued in Indian Patent Application No. 201747025666 with English translation.
European Office Action issued in corresponding European Patent Application No. 15 153 375.9-1208 dated May 11, 2020.
Chinese Office Action issued in corresponding Chinese Patent Application No. 201680007662.9 dated May 7, 2020.
Mexican Office Action corresponding to MX Appln. No. MX/a/2017/009797, dated Mar. 3, 2020.
Vietnamese Office Action dated Sep. 25, 2020 corresponding to Vietnamese Patent Application No. 1-2017-03018, and English translation thereof.
Third Office Action dated Nov. 13, 2020 corresponding to Chinese Patent Application No. 201680007662.9, and concise statement of relevance.

* cited by examiner

SURVEILLANCE

TECHNOLOGICAL FIELD

Embodiments of the present invention relate to monitoring a scene. In particular, they relate to automated monitoring of a scene.

BACKGROUND

Current monitoring systems, such as surveillance systems, may comprise one or more cameras for video recording, with or without audio recording, connected via wires or wirelessly to a hub that stores or enables storage of the data recorded from the scene.

BRIEF SUMMARY

According to various, but not necessarily all, embodiments of the invention there is provided a method as claimed in any of claims 1 to 14.

According to various, but not necessarily all, embodiments of the invention there is provided an apparatus as claimed in claim 15.

According to various, but not necessarily all, embodiments of the invention there is provided
an apparatus comprising: at least one processor; and
at least one memory including computer program code
the at least one memory and the computer program code configured to, with the at least one processor, cause the apparatus at least to perform a method as claimed in any of claims 1 to 14.

According to various, but not necessarily all, embodiments of the invention there is provided a computer program that, when run on a computer, performs: a method as claimed in any of claims 1-14.

BRIEF DESCRIPTION

For a better understanding of various examples that are useful for understanding the brief description, reference will now be made by way of example only to the accompanying drawings in which.

DETAILED DESCRIPTION

The system 100 described is a system that monitors at least one scene. The operation of the system can be controlled by a user within the scene by carrying out actions within the scene. For example, the user is able to control the system so that a message is conditionally presented in the scene when sensor data from the scene satisfies one or more presentation criterion.

Figure 1:
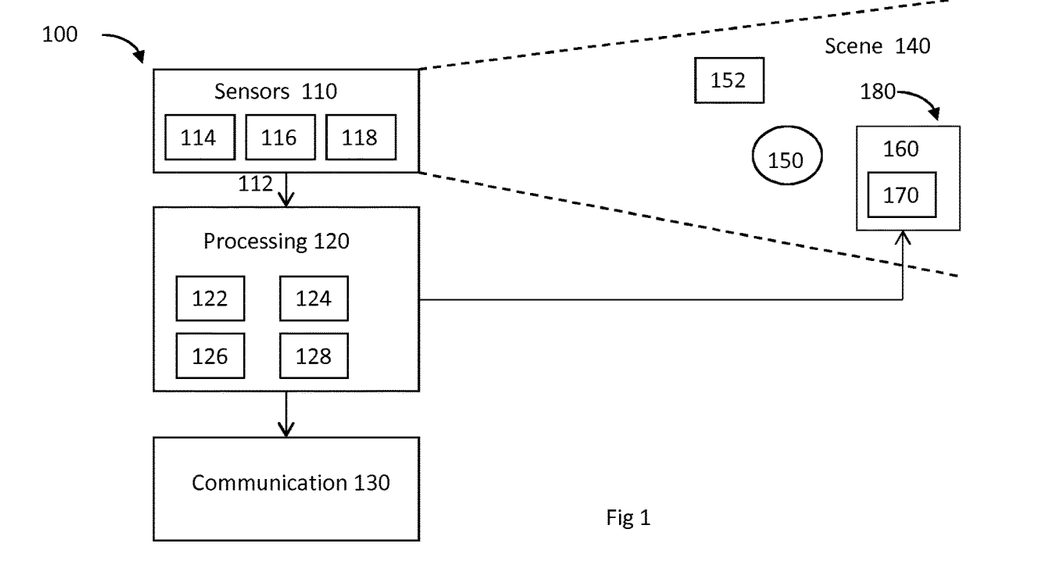
FIG. 1 schematically illustrates an example of a system.

FIG. 1 schematically illustrates a system 100 comprising: one or more sensors 110 configured to record sensor data 112 from a scene 140; a processing module 120 configured to process the sensor data 112 recorded from the scene 140 to recognize automatically events that occur in the scene 140 and to automatically take decisions as a consequence of the recognition; and a communication module 130 configured to communicate, when a decision to communicate is taken by the processing module 120.

Some but not necessarily all of the events that are recognized may relate to an object 152 or a particular object 152 in the scene 140. An object may be an inanimate object, an animal, a person or a particular person 150 in the scene 140. In some but not necessarily all examples of the system 100, the system 100 is a real-time recognition system and the automatic recognition and decision, if any, occur substantially at the same time as the sensor data 112 is recorded.

The system 100 may be used for surveillance, monitoring or other applications. The system 100 may be used in businesses, public areas or at home. One expected use is as a home surveillance system.

The system 100 may enable a user to control monitoring, for example, when the user is a person 150 in the scene 140. The system 100 may enable a user to control recognition and/or a consequence of recognition, for example, when the user is a person 150 in the scene 140.

In some but not necessarily all examples, the system 100 may comprise a number of discrete apparatus. For example, the sensors 110 may be housed in one or more separate apparatus, the processing module 120 may be housed in one or more apparatus and the communication module 130 may be housed in one or more apparatus. Where a component or components of the system 100 are housed in discrete apparatus, those apparatus may be local or remote to each other and, where they are remote they may communicate, for example, over a network.

In some but not necessarily all examples, the system 100 may be housed in a single apparatus.

The sensors 110 are configured to record or enable recording of sensor data 112 from the scene 140.

A scene 140 may comprise static components that have, for example, fixed relative positions, such as for example static objects. These static objects have different static positions in the scene's three-dimensional space (scene space). A scene 140 may comprise moving components, such as for example a moving object. A moving object has different positions in the scene space over time. Reference to 'the scene' in relation to different sensor data 112 or different times implies a continuity of those static components of the scene 140 that are sensed, it does not necessarily imply a continuity of some or all of the dynamic components although this may occur.

The recording of sensor data 112 may comprise only temporary recording, or it may comprise permanent recording or it may comprise both temporary recording and permanent recording. Temporary recording implies the recording of data temporarily. This may, for example, occur during sensing, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur.

The sensors 110 may be configured to transduce propagating waves, such as sound waves and/or light waves, to electrical signals encoding the propagating wave data from the scene 140 as sensor data 112.

In some but not necessarily all examples, the sensors 110 are fixed in space relative to the scene space. In other examples, the sensors 110 are movable or moving relative to the scene space.

In some, but not necessarily all embodiments, the sensors are or comprise image sensors 114. An example of an image sensor 114 is a digital image sensor that is configured to operate as a camera. Such a camera may be operated to record static images and/or video images.

In some, but not necessarily all embodiments, cameras may be configured in a stereoscopic or other spatially distributed arrangement so that the scene 140 is viewed from different perspectives. This may enable the creation of a three-dimensional image and/or processing to establish depth, for example, via the parallax effect.

In some, but not necessarily all embodiments, the sensors 110 are or comprise audio sensors 116. An example of an audio sensor 116 is a microphone or microphones. Microphones may be configured in a stereoscopic or other spatially distributed arrangement, such as a microphone array, so that the scene 140 is sampled from different perspectives. This may enable three-dimensional spatial audio processing, that allows positioning of audio within the scene 140.

In some, but not necessarily all embodiments, the sensors are or comprise depth sensors 118. A depth sensor 118 may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receiver (spatial diversity). In one example, the transmitter is configured to 'paint' the scene with light, preferably invisible light such as infrared light, with a spatially dependent pattern. Detection of a certain pattern by the receiver allows the scene 140 to be spatially resolved. The distance to the spatially resolved portion of the scene 140 may be determined by time of flight and/or stereoscopy (if the receiver is in a stereoscopic position relative to the transmitter).

In these 'passive' or 'non-active' examples of depth sensing the person 150 or object 152 to be sensed are passive and merely reflect incident light or sound waves emitted by a transmitter. However, 'active' examples, which require activity at the sensed object, may additionally or alternatively be used. As an example, a person may carry a positioning apparatus that is configured to position the positioning apparatus within the scene space. The positioning apparatus may for example measure motion of the positioning apparatus from a reference position using accelerometers. Gyroscopes may optionally be used to determine orientation. Additionally or alternatively, the positioning apparatus may enable positioning via triangulation (trilateration) by transmitting to multiple receivers and/or receiving from multiple transmitters.

In the illustrated example, but not necessarily all examples, the processing module 120 comprises a memory sub-module 122, a processing sub-module 124, a recognition sub-module 126, and a control sub-module 128. While the 'modules' are described and illustrated separately they may be, although they need not be, separate or combined in different combinations. For example, the processing sub-module 124, the recognition sub-module 126, and the control sub-module 128 may be performed by the same circuitry or under the control of the same computer program. Alternatively one or more of the processing sub-module 124, the recognition sub-module 126, and the control sub-module 128 may be performed by dedicated circuitry or a dedicated computer program. The sub-modules may be performed using software, dedicated hardware or a mix of programmed hardware and software.

The memory sub-module 122 may be used to store unprocessed sensor data 110 and/or processed sensor data 110 (scene data), computer programs, scene space models and other data used by the processing module 120, although other sub-modules may have their own memories.

The processing sub-module 124 may be configured to process the sensor data 112 to determine scene data that is meaningful about the scene 140.

The processing sub-module 124 may be configured to perform image processing where the sensor data 110 comprises image data from a camera or cameras 114. The processing sub-module 124 may be configured to perform audio processing where the sensor data 110 comprises audio data from a microphone or microphones 116.

The processing sub-module 124 may be configured to perform automatically one or more of the following tasks using the sensor data 112 to create scene data that has potential meaning for the scene 140:
use machine (computer) vision to perform one or more of:
 detect a (moving or stationary) object or person,
 classify a (moving or stationary) object or person, and/or
 track a (moving or stationary) object or person;
use spatial analysis to perform one or more of:
 position a (moving or stationary) object in the scene space using depth determination, and/or
 create a map of the scene space; and/or
use behavior analysis to describe an event that occurs in the scene 140 as a potentially meaningful symbol.

An example of image processing is 'histogram of gradient features' analysis which creates a distribution of intensity gradients or edge directions for an image. The image may be divided into small connected regions (cells), and for each cell, a histogram of gradient directions or edge orientations is created for the pixels within the cell. The combination of these histograms then represents a descriptor.

An example of audio processing is 'mel-frequency cepstral coefficients' determination, spatial audio processing using, for example, audio beamforming techniques, audio event recognition or classification, speaker recognition or verification or speech recognition.

Motion detection may be achieved, for example, using differencing with respect to a background model (background subtraction) or with respect to a preceding image (temporal differencing), or using some other approach such as optical flow analysis using a vector-based approach.

Object classification may be achieved, for example, using shape-based analysis and/or motion-based analysis.

Classification of a person may be classification that an object is human or classification that an object is a particular human (identification). Identification may be achieved using an attribute or a combination of attributes that uniquely identifies a person within the set of possible persons. Examples of attributes include: biometric features that are or may be particular to a person such as their face or their voice: their shape and size; their behavior.

Object tracking may be achieved by labeling objects and recording the position in the scene 140 of the labeled object. The algorithm may need to deal with one or more of the following events: object entrance to the scene 140; object exit from the scene 140; object re-entrance to the scene 140; object occlusion; object merge. How to deal with these events is known in the art.

Object tracking may be used to determine when an object or person changes. For example, tracking the object on a large macro-scale allows one to create a frame of reference that moves with the object. That frame of reference can then be used to track time-evolving changes of shape of the object, by using temporal differencing with respect to the object. This can be used to detect small scale human motion such as gestures, hand movement, facial movement. These are scene independent user (only) movements relative to the user.

The system 100 may track a plurality of objects and/or points in relation to a person's body, for example one or more joints of the person's body. In some examples, the system 100 may perform full body skeletal tracking of a person's body.

The tracking of one or more objects and/or points in relation to a person's body may be used by the system 100 in gesture recognition and so on.

Behavior analysis requires describing an event that occurs in the scene 140 using a meaningful symbology. An event may be something that occurs at a spatio-temporal instance or it may be a spatio-temporal sequence (a pattern of spatio-temporal instances over time). An event may relate to motion of an object (or person) or interaction of a person and object.

In some, but not necessarily all implementations, an event may be represented by a putative symbol defined in terms of parameters determined from the machine (computer) vision analysis and/or the spatial analysis. These parameters encode some or more of what is happening, where it is happening, when it is happening and who is doing it.

The recognition sub-module 126 is configured to recognize a putative symbol encoding an event in the scene 140 as a meaningful symbol associated with a particular meaning.

The recognition sub-module 126 may be configured to recognize a putative symbol, defined in terms of parameters determined from the machine (computer) vision analysis and/or the spatial analysis, and produced by the processing sub-module 124, as having meaning. The recognition sub-module 126 may, for example, store or access a database of meaningful reference symbols and may use a similarity test to determine whether a putative symbol is 'similar' to a meaningful symbol.

The recognition sub-module 126 may be configured as a machine (computer) inference engine or other recognition engine such as an artificial neural network or clustering in the parameter space. The recognition sub-module may 126, in some examples, be trained, via supervised messaging, to recognize meaningful symbols as similar to reference symbols.

The control sub-module 128 responds to the determination that a meaningful event has occurred in the scene 140 in dependence on the event:

a) If the putative symbol is similar to a response symbol, the meaningful event is a 'response' event, and the control sub-module 128 performs a response action.

In some but not necessarily all examples the action performed may be programmed by a user. In some but not necessarily all examples the programming may occur via motion of the user within the scene. Examples are provided below with reference to FIGS. 5A and 5B. Examples of actions performed may be the generation of an alert or notification.

The alert or notification may be provided via the communications module 130. The communications module 130 may communicate wirelessly, via radio waves or via a wired connection to a local or remote apparatus. Examples of such apparatus include but are not limited to displays, televisions, audio output apparatus, personal devices such as mobile telephone or personal computers, a projector or other user output apparatus.

In some but not necessarily all examples the response symbol may be programmed by a user. For example, as described in further detail below with reference to FIGS. 5A and 5B, a user may be able to program or teach a meaningful event that is represented by a meaningful response symbol. The response symbol, created by the user, may be added to the database of reference symbols or otherwise used to recognize a putative symbol as a meaningful symbol. In some but not necessarily all examples the programming may occur via motion of the user within the scene 140. Examples of meaningful events that are represented by meaningful symbols include particular actions or movements performed such as user input gestures.

b) If the putative symbol is similar to a user control symbol, the meaningful event is a 'user control' event, and the control sub-module 128 enables user control of monitoring and/or user control of the response.

As described in further detail below with reference to FIGS. 5A and 5B, an example of a 'user control' event, is a messaging event, that is represented by a messaging symbol. Recognition that a putative symbol matches a leaning symbol enables a user to program or teach a meaningful response event and/or a response action for that response event. Examples of actions performed may be the generation of an alert or notification.

Figure 2:
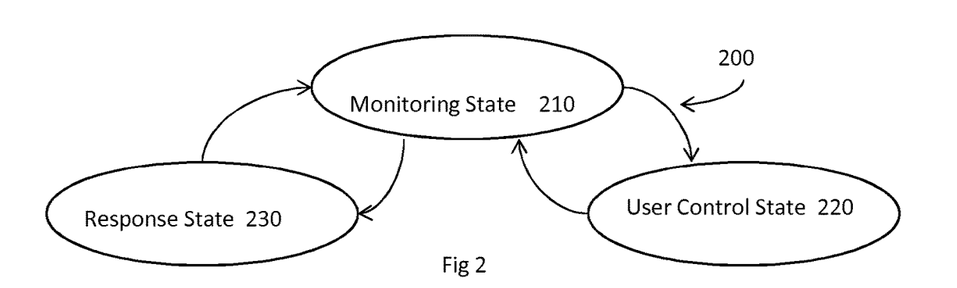
FIG. 2 illustrates an example of a state machine.

The operation of the processing module 120 may be further understood from FIG. 2 which illustrates a state machine 200 for the processing module 120. The state machine 200 has a monitoring state 210, a user control state 220 and an automatic response state 230.

In the monitoring state 210, the sensors 110 provide sensor data 112, and the processing sub-module 124 automatically processes the sensor data 112 (video and/or audio and/or depth) to create scene data that has potential meaning. The recognition sub-module 126 automatically processes the scene data to identify actual meaning, that is meaningful symbols, within the scene data.

The meaningful symbols are predetermined, that is actions have occurred that determine a symbol prior to recognition. However, 'predetermined' should not be considered to mean exact or fixed. The symbol used for similarity matching merely has prior determination, it may dynamically evolve or may be fixed.

If the recognition sub-module 126 determines that a meaningful event has occurred in the scene 140, the control sub-module 128 responds automatically depending on the event. If the meaningful event is a 'response' event, then the state machine 200 transitions to the response state 230 and the control sub-module 128 performs the response action associated with that response event. If the event is a 'user control' event, then the state machine 200 transitions to the user control state 220 and user control of monitoring and/or response is enabled in a manner associated with that user control state 220.

A particular gesture user input may be used as a 'user control' event. A gesture user input is a gesture that has meaning to the system 100 as a user input. A gesture may be static or moving. A moving gesture may comprise a movement or a movement pattern comprising a series of movements. For example it could be making a circling motion or a side to side motion or an up and down motion or the tracing of a sign in space. A moving gesture may, for example, be an apparatus-independent gesture or an apparatus-dependent gesture. A moving gesture may involve movement of a user input object e.g. a user body part or parts, or a further apparatus, relative to the sensors 110. The body part may comprise the user's hand or part of the user's hand such as one or more fingers and thumbs. In other examples, the user input object may comprise a different part of the body of the user such as their head or arm. Three-dimensional movement may comprise motion of the user input object in any three orthogonal directions. The motion may comprise the user input object moving towards or away from the sensors 110 as well as moving in a plane parallel to the sensors or any combination of such motion. A gesture may be a non-contact gesture. A non-contact gesture does not contact the apparatus sensors at any time during the gesture. A gesture may be an absolute gesture that is defined in terms of an absolute displacement from the sensors 110. Such a gesture may be tethered, in that it is performed at a precise location in the scene space. Alternatively a gesture may be a relative gesture that is defined in terms of relative displacement during the gesture. Such a gesture may be un-tethered, in that it need not be performed at a precise location relative in the scene space and may be performed at a large number of arbitrary locations. A gesture may be defined as evolution of displacement, of a tracked point relative to an origin, with time. It may, for example, be defined in terms of motion using time variable parameters such as displacement, velocity or using other kinematic parameters. An un-tethered gesture may be defined as evolution of relative displacement Δd with relative time Δt. A gesture may be performed in one spatial dimension (1D gesture), two spatial dimensions (2D gesture) or three spatial dimensions (3D gesture).

In some examples, the system 100 may track one or more objects and/or points in relation to a person's body in gesture recognition. For example, the system 100 may perform full skeletal tracking of a person's body in gesture recognition.

Implementation of the processor module 120 or part of the processor module 120 may be as controller circuitry. The controller circuitry 120 may be implemented in hardware alone, have certain aspects in software including firmware alone or can be a combination of hardware and software (including firmware).

Figure 3:
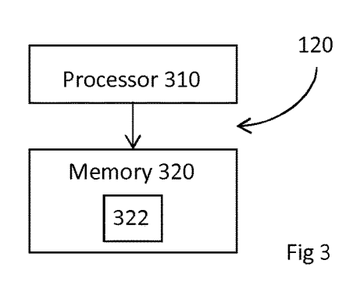
FIG. 3 illustrates an example of a processing module.

As illustrated in FIG. 3 the controller 120 may be implemented using instructions that enable hardware functionality, for example, by using executable computer program instructions 322 in a general-purpose or special-purpose processor 310 that may be stored on a computer readable storage medium (disk, memory etc) to be executed by such a processor 310.

The processor 310 is configured to read from and write to the memory 320. The processor 310 may also comprise an output interface via which data and/or commands are output by the processor 310 and an input interface via which data and/or commands are input to the processor 310.

The memory 320 stores a computer program 322 comprising computer program instructions (computer program code) that controls the operation of the processing module 120 when loaded into the processor 310. The computer program instructions, of the computer program 322, provide the logic and routines that enables the processing module to perform the methods discussed with reference to FIGS. 1 and 2. The processor 310 by reading the memory 320 is able to load and execute the computer program 322.

The system 100 may therefore comprise an apparatus 120 that comprises:
at least one processor 310; and at least one memory 320 including computer program code 322 the at least one memory 320 and the computer program code 322 configured to, with the at least one processor 310, cause the apparatus 120 at least to perform one or more of blocks 124, 126, 128 of FIG. 1.

Figure 4:
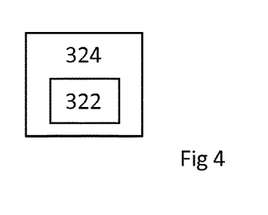
FIG. 4 illustrates an example of a delivery mechanism for a computer program.

As illustrated in FIG. 4, the computer program 322 may arrive at such an apparatus via any suitable delivery mechanism 324. The delivery mechanism 324 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 322. The delivery mechanism may be a signal configured to reliably transfer the computer program 322. The apparatus 120 may propagate or transmit the computer program 322 as a computer data signal.

Although the memory 320 is illustrated as a single component/circuitry it may be implemented as one or more separate components/circuitry some or all of which may be integrated/removable and/or may provide permanent/semi-permanent/dynamic/cached storage.

Although the processor 310 is illustrated as a single component/circuitry it may be implemented as one or more separate components/circuitry some or all of which may be integrated/removable. The processor 310 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks 124, 126, 128 illustrated in the FIG. 1 may represent steps in a method and/or sections of code in the computer program 322. The illustration of a particular order to the blocks does not necessarily imply that there is a required or preferred order for the blocks and the order and arrangement of the block may be varied. Furthermore, it may be possible for some blocks to be omitted.

Controlling Presentation of a Message

Figure 5A:
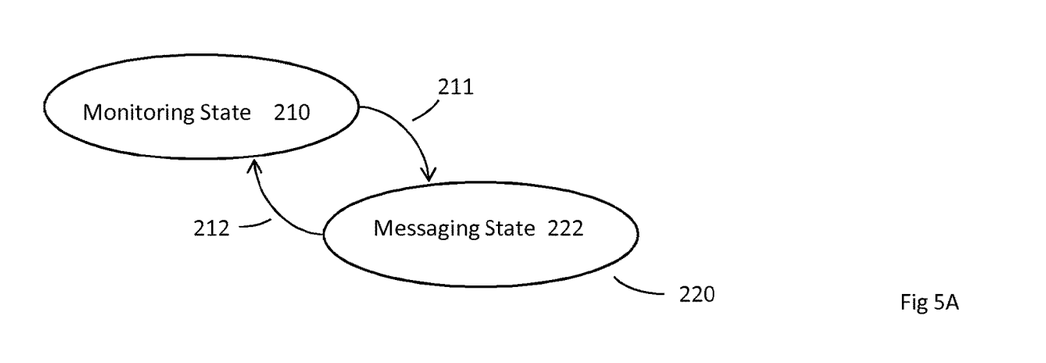
FIG. 5A illustrates an example of a process of creating a new presentation state for a state machine.
Figure 5B:
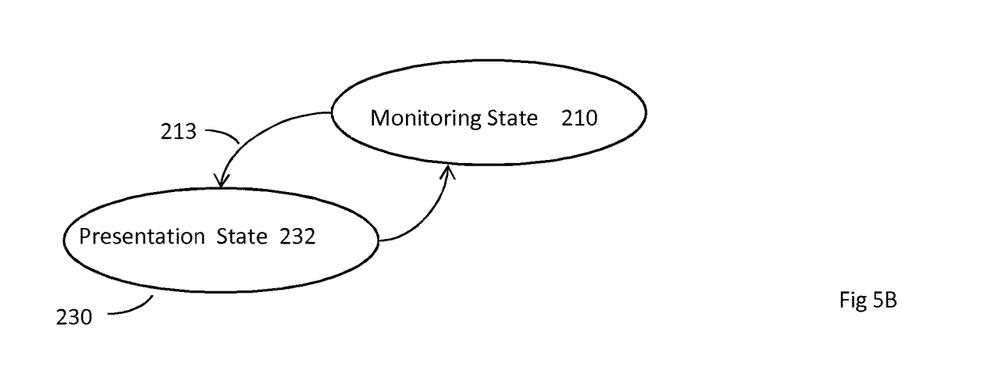
FIG. 5B illustrates an example of a process of transitioning from a monitoring state to the new presentation state and performing an associated presentation action.

FIGS. 5A and 5B illustrate how a state machine 200 as previously described may be programmed by a user, and, in particular by user action within the scene 140. FIG. 5A illustrates the process of using a new user control state 220 (a messaging state 222) to create a new response state 230 (a presentation state 232) for the state machine 200. FIG. 5B illustrates the process of transitioning 213 from the monitoring state 210 to the new presentation state 232 and performing an associated presentation action.

As previously described, in the monitoring state 210, the sensors 110 provide sensor data 112, and the processing sub-module 124 automatically processes the sensor data 112 (video and/or audio and/or depth data) to create scene data that has potential meaning. The recognition sub-module 126 automatically processes the scene data to identify actual meaning within the scene data.

For example, referring back to FIG. 1, a message 170 may be associated with one or more presentation criterion and a physical location 180 in the scene. The recognition sub-module 126 may automatically process the scene data to recognize automatically satisfaction of the one or more presentation criterion. In response to recognition of satisfaction of the one or more presentation criterion the state machine 200 enters the presentation state 232, which enables automatic presentation of the message 170 into the scene 140 at the physical location 180 by a presentation engine 160.

Examples of presentation engines 160 may include a visible presentation engine which presents the message visually, an audible presentation engine which presents the message visually and a haptic presentation engine which presents the message via touch.

A presentation engine may be provided only for the purpose of presenting a message or for some other purpose or purposes.

Examples of visible presentation engines include but are not limited to a visual display screen within the scene 140 that displays the message 170 within the scene 140 and one or more visual projectors that projects the message 170 within the scene 140, for example onto a surface within the scene 140 such as, for example, a wall or floor.

Messaging State

Referring back to FIG. 5A, in the monitoring state 210, the sensors 110 provide sensor data 112, and the processing sub-module 124 automatically processes the sensor data 112 (video and/or audio and/or depth data) to create scene data that has potential meaning. The recognition sub-module 126 automatically processes the scene data.

The recognition sub-module 126 determines when a messaging event has occurred in the scene 140 by recognizing a messaging symbol, created by a user, within the scene data 112 as a user input command for changing state to the messaging state 222. The control sub-module 128 responds automatically to this determination by transitioning 211 to the messaging state 222. A feedback indication may be provided to the user such as, for example, an audible or visible confirmation that the messaging state 222 has been entered.

The messaging symbol may, for example be defined using any one or more of video data, audio data and depth data obtained from the sensor data 112.

In some but not necessarily all examples, only video data is used to recognize a messaging symbol. In this example, the messaging symbol may be, as described previously, a time-evolving, scene independent symbol sequence defined by motion of a tracked user relative to a frame of reference at the tracked user. An example of a messaging symbol is a gesture user input.

In some but not necessarily all examples, audio data and/or depth data is used to recognize a messaging symbol. In this example, the messaging symbol may be a time-evolving, scene independent symbol sequence defined by actions of a tracked user. For example, a depth map may be determined and then a user's changing body position inferred using machine learning. This may be done, for example, at a rate of approximately 30 frames per second. The positions of the user's joints are produced as an output and gestures can be defined as a symbol comprising positions of the user's joints. In the case of audio input, an example of a detectable gesture could be a hand clap.

In some but not necessarily all examples, the recognition sub-module 126 may determine that a messaging event has occurred in the scene 140 and transition 211 to the messaging state 222 when it detects an abnormal situation such as an abnormal behavior or an abnormal behavior for a recognized person or detects an unrecognized person. The determination of abnormal may be based upon historical monitoring of the scene 140.

Program Trigger

In the messaging state 222, a user, by performing actions within the scene 140, is able to define a new 'response event' (a presentation event) and a corresponding new response symbol (a presentation symbol) and create a new response state (a presentation state 232) in the state machine 200, as illustrated in FIG. 5B.

In the messaging state 222, the system 100 automatically processes recorded sensor data 112 from the scene 140, relating to user action in the scene 140, to enable user programming of one or more of: one or more presentation criterion; the physical location 180; and a composition (content) of the message 170.

During user programming the system 100 may provide a user interface for programming using the presentation engine 160. The presentation engine 160 may, for example, present selectable options, for example, as a menu or keyboard. A user may select different options by performing a gesture, such as pointing, relative to the respective options.

In some but not necessarily all examples, the user action may comprise speech and the processing of recorded sensor data comprises speech recognition processing. User programming may, for example, be achieved by speaking.

In some but not necessarily all examples, the user action may comprise a time-evolving, scene independent symbol sequence defined by motion of a tracked user relative to a frame of reference at the tracked user. User programming may, for example, be achieved by drawing characters in space.

The one or more presentation criterion may be determined by the user action within the scene 140.

In some but not necessarily all examples, the one or more presentation criterion may comprise one or more of:
presence of an object or person in the scene 140,
a particular classification or identification of an object or person in the scene 140,
a particular tracking of an object or person in the scene 140;

a particular positioning of an object or person in the scene 140;

a particular depth map of the scene space; and/or a particular determined symbol describing an event that occurs in the scene 140.

If multiple criteria are used then they may be combined using Boolean logic. For example, alternative criteria where the satisfaction of only one of the criteria is necessary may be defined as a combination using 'OR'. For example, necessary criteria where the satisfaction of multiple criteria is necessary may be defined as a combination using 'AND'. It will be appreciated that complex logical expression may be created by nesting combinations within other combinations as is known in the art.

In some but not necessarily all examples, the one or more presentation criterion defined by the user may be necessary conditions for presentation of the message 170.

In some but not necessarily all examples, the one or more presentation criterion defined by the user may be necessary and sufficient conditions for presentation of a message 170.

As an example, the one or more presentation criterion may comprise at least one person specific presentation criterion. The system 100 processes recorded sensor data 112 from the scene 140 to recognize automatically satisfaction of the one or more presentation criterion by processing the recorded sensor data 112 from the scene 140 to recognize automatically a specific person in the scene 140. This may, for example, be achieved by performing face recognition processing and/or voice recognition processing.

As an example, the one or more presentation criterion may comprise at least one behavior specific presentation criterion. The system 100 processes recorded sensor data 112 from the scene 140 to recognize automatically satisfaction of the one or more presentation criterion by processing the recorded sensor data 112 from the scene 140 to recognize automatically a specific behavior in the scene 140. This may, for example, be achieved by performing machine vision processing; spatial analysis processing; behavior analysis processing; speech recognition processing; and/or face recognition processing. In this way if may be possible to characterize a behavior or activity within the scene 140, and if appropriate the person involved in the activity.

The one or more presentation criterion may comprise other conditions that are necessary for satisfaction before the message 170 is presented in the scene 140.

For example, the one or more presentation criterion may comprise one or more temporal criterion specifying a date or time or delay or a duration. The message 170 may, for example, only be presented in the scene on that date, and/or at that time.

Alternatively, the message 170 may, for example, only be presented in the scene after the delay. The message 170 may, for example, only be presented for the duration.

The system 100 may be configured to suggest to a user one or more presentation criterion for selection as some or all of the one or more presentation criterion used to control presentation of the message 170 in the scene 140.

A suggested presentation criterion may, for example, be automatically determined in dependence upon one or more of: a physical location of the user; a person or persons commonly in the scene 140 or at the user location in the scene 140; a content of the message.

It may, for example, be determined that the physical location 180 is the user location. The physical location 180 may be used as one of the one or more presentation criterion.

Program Presentation

In the messaging state 222, a user, by performing additional actions within the scene 140, may be able to define the response action (a presentation action) associated with the new presentation state 232.

The presentation action may, for example, be presentation of a message that has user determined content at the physical location 180.

The physical location 180 in the scene 140 may be determined automatically in dependence upon one or more of: a location of the user during the user action and a content of the message 170.

Programming of the presentation action may occur in the messaging state 222, by automatically processing, at the processor sub-module 124, the sensor data 112 (video and/or audio and/or depth data) of the scene 140 to enable automatic recognition by the recognition sub-module 126 of a predetermined action symbol associated with a particular presentation action. In response to said recognition, the control sub-module 128 programs the state machine 200 so that the presentation action is performed when the presentation state 232 is entered.

The predetermined action symbol may be a time-evolving, scene independent symbol sequence defined by motion of a tracked user relative to a frame of reference at the tracked user. The predetermined action symbol may be a user input gesture. For example, a depth map may be determined and then a user's changing body position inferred using machine learning. This may be done, for example, at a rate approximately 30 frames per second. The positions of the user's joints are produced as an output and gestures can be defined as a symbol comprising positions of the user's joints.

The user may therefore be able to compose a message from within the scene 140 by drawing characters in space and/or by speaking and/or by using a user interface provided via the presentation engine 160. The recorded sensor data 112 from the scene 140 is processed to create the message 170.

The message 170 may be, in some but not necessarily all examples, a text message.

Return to Monitoring State

Referring back to FIG. 5A, the transition 212 back from the messaging state 222 to the monitoring state 210 may occur in a number of ways. In some examples, it may occur automatically after the user has controlled creation of a new presentation state 232 and the presentation event for transitioning 213 to that new state 232 or may occur in response to user action such as an audible event. In other examples, it may occur automatically after the user has additionally programmed the presentation action (message 170 and/or physical location 180) associated with the presentation state 232.

Presentation State

Referring to FIG. 5B, as previously described, in the monitoring state 210, the sensors 110 provide sensor data 112, and the processing sub-module 124 automatically processes the sensor data 112 (video and/or audio and/or depth data) to create scene data that has potential meaning. The recognition sub-module 126 automatically processes the scene data to identify actual meaningful events within the scene data. If the meaningful event is a 'presentation' event, for example, then the state machine 200 transitions 213 to the presentation state 232 and the control sub-module 128 performs the presentation action associated with that presentation state 232.

The system 100 associates the message 170 with one or more presentation criterion and a physical location 180 in the scene 140. The system 100 automatically processes recorded sensor data 112 from the scene to recognize automatically satisfaction of the one or more presentation criterion; and in response to recognition of satisfaction of the one or more presentation criterion enters the presentation state 232. The presentation state 232 enables automatic presentation of the message 170 into the scene 140 at the physical location 180.

The one or more presentation criterion may comprise at least one person specific presentation criterion. Processing the recorded sensor data 112 from the scene 140 to recognize automatically satisfaction of the one or more presentation criterion then comprises processing recorded sensor data 112 from the scene 140 to recognize automatically a specific person in the scene 140.

The one or more presentation criterion may have been predetermined in the messaging state 222 as previously described.

The physical location 180 may have been predetermined in the messaging state 222 as previously described.

The message 170 may have been predetermined in the messaging state 222 as previously described.

The presentation state 232 may be entered temporarily such that the message 170 is presented in the scene 140 temporarily for a limited duration.

Presentation of the message 170 within the scene 140 at the physical location 180 may, as previously described, comprise displaying the message 170 from a display at the physical location 180 and/or projecting the message onto a surface at the physical location 180.

In the presentation state 232, a user, by performing additional actions within the scene 140, may be able to reprogram one or more of: one or more presentation criterion; the physical location 180; and the message composition.

In the presentation state 232, a user, by performing additional actions within the scene 140, may be able to reprogram the state machine 200.

For example, the user may acknowledge that a message 170 has been read, this may have the consequence of preventing future presentation of that message 170 to that user or to any user. The user may acknowledge that a message 170 has been read (for herself), this may have the consequence of preventing future presentation of that message 170 to her. The user may acknowledge that a message 170 has been read (for all), this may have the consequence of preventing future presentation of that message 170 to anyone else.

For example, the user may reject a message 170. This may have the consequence of preventing future presentation of that message 170 to that user. It may result in a change to the one or more presentation criterion and/or the physical location and/or the message composition. This may, for example, cause, at a later time, the same/different message 170 to be presented to a different user at the same/different physical location 180.

For example, the user may delegate a message 170 to a particular person. The user may identify that particular person or the system 100 may automatically identify that particular person. This may have the consequence of preventing future presentation of that message 170 to the user. It may result in a change to the one or more presentation criterion and/or the physical location and/or the message composition. This may, for example, cause, at a later time, the same/different message 170 to be presented to that particular person at the same/different physical location 180.

In the presentation state 232, when the user performs additional actions within the scene 140 and reprograms one or more of: one or more presentation criterion; the physical location 180; and the message composition, those actions may be dedicated reprogramming actions that may be used in all circumstances to reprogram one or more of: one or more presentation criterion; the physical location 180; and the message composition. That is the same reprogramming actions are used for all presentation states. For example, there may be a common gesture for acknowledging a presented message 170, a different common gesture for rejecting a presented message 170 and a different common gesture for delegating a presented message 170.

Alternatively, in other examples those additional actions may be reprogramming actions that are defined only for this particular presentation state 232. For example, the presented message 170 may request that a user performs a particular behavior. If the performance of that behavior is recognized then it may be automatically used as a user acknowledgement. As described above, this may have the consequence of preventing future presentation of that message 170 to that user or to any user

EXAMPLES

In order to better understand the invention, some examples of how it may be used in a home, office, factory or public environment are provided below. However, the invention is not limited to these examples.

In one example, a surveillance camera 114 is mounted inside an apartment. The surveillance camera 114 is connected to a computer system which runs analysis algorithms on the video data and optional depth data and optional audio data. The analysis comprises person recognition using face recognition applied on the video data and optionally speaker recognition methods applied on the audio data.

The system also monitors person activities. Typical recognized activities may include walking, standing, watering flowers, taking out the trash, washing dishes, washing clothes, cleaning windows, cleaning floors, filling paper to a printer, and the like. The recognized activities may depend on the context where the system 100 is deployed, for example, whether it is a factory floor or a person's home.

The system 100 also monitors person gestures. Typical gestures include holding a hand on the wall, interacting with a wall display, for example, pressing a projected button icon or writing a character.

A user (husband) walks close to a flower pot and is recognized by the video surveillance system 100. The user makes a gesture by placing his hand on the wall and holding it there for a few seconds. This is recognized by the video surveillance system 100 and it prompts the user whether he wishes to leave a message 170 to his wife.

In one embodiment, the presentation of the message 170 is done with one or more projectors 160 which enable information to be projected onto the walls or floor. In some other embodiments, the message might be shown on a computer display or TV monitor or the like.

The system 100 automatically suggests to leave a message 170 to the wife as it has observed, based on activity monitoring data that his wife has interacted near the location of the flower pot many times, watering it.

In this case, the user (husband) decides to leave a message 170 to his wife requesting her to water the flowers.

The user leaves the message 170 by creating the characters on the wall with gestures (recognized by gesture recognition methods) or by giving a voice prompt to the system 100 which can be recognized with speech recognition technology. The message 170 is projected on the wall.

In some embodiments, the system 100 may automatically suggest recipients for the message 170 based on the message content and/or the physical location 180 where the message 170 is left. If the message 170 is being left near the flower pot, the system 100 may determine the user who most frequently interacts with the flowers. The system 100 may show the suggested recipients projected on the wall, and the user can select or change between the recipients by swipe gestures applied on top of the recipient name.

Optionally, the system 100 analyzes the message content using text content analysis. In particular, the system 100 may analyze the textual content in the message to determine whether there is an action mentioned in the message. In this case, there is an action 'water the flowers' included in the message.

The user (husband) goes away and the message 170 disappears. The system 100 recognizes the user going away and fades away the message 170, or fades away automatically after the user stops interacting with the message 170 for a predetermined time.

When the wife arrives in the apartment and walks to the vicinity of the flower pot, a person recognition method is used to recognize the wife and activity recognition is used to recognize that the wife is near the flower pot.

After the system 100 recognizes a person, it may check whether there are messages 170 for this person.

Optionally, the system 100 may check whether there are messages 170 associated with the particular location of the user.

If there are messages 170 to be provided, the system 100 uses projectors 160 to display the message on the wall or ceiling, near the item which the message involves.

After presenting the message 170, the system 100 continues to monitor the user activities. In particular, the system 100 continues to monitor the activities of the user who just received the message 170. In one embodiment, the recipient of the message may acknowledge the message by providing a gesture, such as drawing a check mark with his hand over the message 170 or nearby the message 170. In this case the message disappears and will not be shown again, it has been acknowledged as done. The user might also reject the message 170 with a gesture, e.g., by drawing a cross with a gesture on top of the message 170. In this case, the message 170 can be shown again to another user or to the same user at a different time, until someone marks it as acknowledged. If the user thinks the message 170 concerns another user, he may delegate it further. For example, the user may make a gesture as if to grab the message 170, and then pull it slightly sidewards. As a result, the system 100 may bring up an option to delegate to another user, and show the list of possible other recipients. The other recipients may be determined as other persons who frequently perform the activity referred to in the message 170 and/or interact with objects referred to in the message 170.

In another embodiment, the system 100 executes activity recognition on the sensor data 112 and determines that the wife has executed the action referred to in the message 170. The system 100 earlier used textual content analysis to determine that the message 170 involved watering the flowers. In this case the system 100 analyzes the user activity to determine whether she proceeds to perform the activity which the message 170 concerned. As the wife now waters the flowers the system 100 detects this and fades away the message 170.

In some embodiments, the system 100 may automatically suggest leaving messages 170. In particular, if a user looks at an item (toilet paper holder, flower pot) for a predetermined time, the system 100 automatically suggests/asks whether to leave a message 170 considering this item. The looking at an item is detected using activity recognition in the surveillance system 100.

In some embodiments, the system 100 can suggest the recipient of the message based on past interactions of different persons with this kind of situation (who has watered the flowers recently).

The system 100 can be used either on the site, or remotely.

In some embodiments, the system 100 is used to detect abnormal situations which it then highlights to the user. Highlighting may mean projecting a message 170 near the object which the abnormal situation relates to. For example, if the flowers are drooping the flower pot might be highlighted with the projectors 160 of the surveillance system 100. If the user is accessing the system 100 remotely via a user interface, the portion on the user interface matching the flower pot might be highlighted.

The system 100 can automatically select a suitable location for the message 170 (near the action which needs to be performed). The system 100 analyzes the textual content of the message 170, and determines what object or activity the message 170 concerns. Based on the determination, it decides a suitable physical location 180 for the message 170, for example, near the location of the object or where the activity is typically performed.

Each message 170 may have a certain lifetime after which it is not presented anymore. The lifetime may be defined in system preferences or the users may set it themselves.

Alternatively, the system 100 may automatically determine that a message is no longer relevant. For example, if there is a message 170 concerning buying more food, and then someone comes with groceries and puts them on the fridge the message 170 may be automatically deleted.

The message 170 may also be left with timing information. In the flower watering example, the husband might be going on a trip and wants the flowers to be watered once during the trip (one week from now). The timing information may be input as text in the message. 'Please water the flowers. (Next Wednesday)'. This will cause the message to be shown only during the times indicated in the message 170. Referring to the above example message 'Please water the flowers. (Next Wednesday)', the message would be shown to the wife only on the date specified (next Wednesday).

The system 100 may be used to leave temporary messages 170 to other members of the household, such as 'water the flowers', 'toilet paper has run out' or leave temporary messages 170 for other workers in an office, factory, shop, or other workplace, such as, 'insert more paper in the printer', 'coffee is out', 'this machine needs lubrication', 'this component is running out of stock'.

In the foregoing examples, it should be appreciated that the video capture that occurs in the messaging state 220 may be in respect of the same scene 140 as the video monitoring that occurs in the monitoring state 210. In fact, the video capture that occurs in the messaging state 220 may be by the same camera as the video monitoring that occurs in the monitoring state 210.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
    associating a message with one or more presentation criterion and a predetermined physical location in a scene which is recorded by one or more sensors,
    wherein satisfaction of the one or more presentation criterion causes presentation of the associated message at the associated physical location, which is one of a plurality of different physical locations in the scene recorded by the one or more sensors;
    automatically processing recorded sensor data from the scene to recognize automatically satisfaction of the one or more presentation criterion; and
    in response to recognition of satisfaction of the one or more presentation criterion entering a presentation state to enable automatic presentation of the message into the scene at the predetermined physical location.

2. A method as claimed in claim 1,
    wherein the one or more presentation criterion comprise at least one person specific presentation criterion, and wherein the automatically processing recorded sensor data from the scene to recognize automatically satisfaction of the one or more presentation criterion comprises processing recorded sensor data from the scene to recognize automatically a specific person in the scene.

3. A method as claimed in claim 1,
    wherein the one or more presentation criterion comprise at least one behavior specific presentation criterion, and wherein the automatically processing recorded sensor data from the scene to recognize automatically satisfaction of the one or more presentation criterion comprises processing recorded sensor data from the scene to recognize automatically a specific behavior in the scene.

4. A method as claimed in claim 1,
    wherein the one or more presentation criterion comprise one or more of:
    presence of an object or person in the scene,
    a particular classification or identification of an object or person in the scene,
    a particular tracking of an object or person in the scene;
    a particular positioning of an object or person in the scene;
    a particular depth map of the scene space; or
    a particular determined symbol describing an event that occurs in the scene.

5. A method as claimed in claim 1, wherein the one or more presentation criterion comprise a temporal criterion specifying one or more of date, time, delay, duration.

6. A method as claimed in claim 1, comprising:
    automatically processing recorded sensor data from the scene, relating to an action of a user in the scene, to enable user programming of one or more of:
    one or more presentation criterion;
    the predetermined physical location;
    the message composition.

7. A method as claimed in claim 6, wherein the action of the user comprises speech and the automatically processing of recorded sensor data from the scene comprises speech recognition processing.

8. A method as claimed in claim 6, comprising determining the predetermined physical location in the scene in dependence upon one or more of:
    a location of the user during the action of the user, a content of the message.

9. A method as claimed in claim 1, comprising suggesting to a user one or more presentation criterion for selection as a some or all of the one or more presentation criterion; used when automatically processing the recorded first sensor data from the scene to recognize automatically satisfaction of the one or more presentation criterion.

10. A method as claimed in claim 9, wherein the suggested presentation criterion is determined in dependence upon one or more of:
    a physical location of the user;
    a person or persons in the scene or at a location of a user performing an action of the user in the scene; and
    a content of the message.

11. A method as claimed in claim 1, comprising: processing recorded sensor data from the scene to enable composition of the message.

12. A method as claimed in claim 1, comprising:
    automatically processing recorded sensor data from the scene to enable automatic entering of a messaging state to enable definition of one or more of:
    one or more presentation criterion;
    the predetermined physical location;
    the message composition.

13. A method as claimed in claim 1, wherein presentation of the message into the scene at the predetermined physical location comprises displaying the message from a display at the physical location or projecting the message onto a surface at the predetermined physical location.

14. A method as claimed in claim 1, comprising enabling reprogramming as a consequence of activity in the scene of one or more of:
   one or more presentation criterion;
   the predetermined physical location;
   the message composition.

15. A method as claimed in claim 1, further comprising:
   automatically determining one or more suggested presentation criterion; and
   enabling the one or more suggested presentation criterion to be provided to a user for selection as some or all of the one or more presentation criterion.

16. A method as claimed in claim 1, wherein the associating the message with one or more presentation criterion and the predetermined physical location in the scene is in response to an action of a user in a scene.

17. An apparatus, comprising:
   at least one processor; and
   at least one memory including computer program code;
   the at least one memory and the computer program code configured to, with the at least one processor, cause the apparatus at least to perform
   associating a message with one or more presentation criterion and a predetermined physical location in a scene which is recorded by one or more sensors,
   wherein satisfaction of the one or more presentation criterion causes presentation of the associated message at the associated physical location, which is one of a plurality of different physical locations in the scene recorded by the one or more sensors;
   automatically processing recorded sensor data from the scene to recognize automatically satisfaction of the one or more presentation criterion; and
   in response to recognition of satisfaction of the one or more presentation criterion entering a presentation state to enable automatic presentation of the message into the scene at the predetermined physical location.

18. A system, comprising:
   one or more sensors configured to record sensor data from a scene;
   an apparatus according to claim 17; and
   a presentation engine configured to present information into the scene.

19. An apparatus according to claim 17, wherein the at least one memory and computer program code are further configured such that the one or more presentation criterion comprise at least one person specific presentation criterion, and wherein the automatically processing recorded sensor data from the scene to recognize automatically satisfaction of the one or more presentation criterion comprises processing recorded sensor data from the scene to recognize automatically a specific person in the scene.

20. An apparatus according to claim 17, wherein the one or more presentation criterion comprise at least one behavior specific presentation criterion, and wherein the automatically processing recorded sensor data from the scene to recognize automatically satisfaction of the one or more presentation criterion comprises processing recorded sensor data from the scene to recognize automatically a specific behavior in the scene.

21. An apparatus according to claim 17, wherein the one or more presentation criterion comprise one or more of:
   presence of an object or person in the scene,
   a particular classification or identification of an object or person in the scene,
   a particular tracking of an object or person in the scene;
   a particular positioning of an object or person in the scene;
   a particular depth map of the scene space; or
   a particular determined symbol describing an event that occurs in the scene.

* * * * *